United States Patent

[11] 3,614,399

[72] Inventor John C. Linz
2 Jeffrey Circle, Bedford, Mass. 01730

[21] Appl. No. 756,519
[22] Filed Aug. 30, 1968
[45] Patented Oct. 19, 1971

[54] METHOD OF SYNTHESIZING LOW-FREQUENCY NOISE
46 Claims, 6 Drawing Figs.

[52] U.S. Cl. .......... 235/152, 331/78
[51] Int. Cl. .......... G06f 1/02, G06f 7/38
[50] Field of Search .......... 235/152; 328/27; 331/78; 307/220

[56] References Cited

UNITED STATES PATENTS 3,366,779 1/1968 Catherall et al. .......... 235/152

OTHER REFERENCES

" A Random Signal Generator," D. Tait and M. Skinner, Electronic Engineering, Jan. 1966, Pgs. 2-7

" A Low-frequency Pseudo-random Noise Generator," C. Kramer, Electronic Engineering, July 1965, Pgs. 465-467

" Noise Generated by Digital Techniques," R. Buron and R. Marsollier, IBM Tech, Disclosure Bulletin, Feb. 1966, Pg. 1232

" The Generation of Random-Time Pulses...," G. White, J. Sci. Instrum., 1964, Vol. 41, Pgs. 361-364.

*Primary Examiner*—Malcolm A. Morrison
*Assistant Examiner*—James F. Gottman
*Attorney*—John R. Utermohle

ABSTRACT: A method of synthesizing low-frequency noise wherein the low-frequency noise has a controllable amplitude distribution, so as to be able to select a desired amplitude-level distribution, such as Gaussian, Poisson, or Uniform distribution. The desired amplitude distribution is derived from a digital-random-variable sequence, having a plurality of characteristics, by selecting the characteristic appropriate to the desired amplitude distribution and performing an appropriate digital operation on the selected characteristic.

FIG. 4

PRIOR ART

*INVENTOR*
JOHN C. LINZ

BY

*ATTORNEY*

*INVENTOR*
JOHN C. LINZ

BY [signature]

*ATTORNEY*

INVENTOR
JOHN C. LINZ

BY

ATTORNEY

METHOD OF SYNTHESIZING LOW-FREQUENCY NOISE

The invention described in the specification and claims may be manufactured and used by or for the Government for governmental purposes without the payment of any royalty thereon.

FIELD OF THE INVENTION

The present invention is a method of noise generation, more particularly it is a method of synthesizing low-frequency noise, having a controllable amplitude distribution.

PRIOR ART

Several methods of low-frequency noise generation have been utilized in prior art devices; however, the prior art techniques are limited to providing only a Gaussian distribution for the low-frequency noise. None of the prior art techniques have the capability of synthesizing a variety of noise distributions, such as Poisson, Uniform, or Gaussian amplitude distributions, by controlling the amplitude distribution. The amplitude distribution of the resulting low-frequency noise is a function, in the present technique, of a digital operation which is performed on a digital-random variable.

Noise can be very useful tool in the analysis of various linear systems. Although generating this noise can be very direct in most frequency ranges, it becomes difficult for low frequencies. Reasons for the difficulty are two fold; a lack of good low-frequency noise sources, and a need for complex schemes to amplify the low-frequency signal, particularly subaudio, to useable levels. These conditions effectively impose a low-frequency limit on the commonly used techniques for noise generation. For those applications requiring noise without a low-frequency limitation, the noise must be generated in a much less direct manner.

Although techniques exist for generating low-frequency noise, the time domain statistical properties of the resulting noise are not so well defined. This is because these methods usually perform a frequency shifting operation on a higher-frequency noise, and as a result, the statistical properties of the low-frequency noise are functions of the statistical properties of the higher-frequency noise; but, the usual practice, is to define the higher-frequency noise in terms of a power spectrum instead of in terms of its time domain statistical properties. This, however, does not preclude the use of such noise in a low-frequency Gaussian noise generator because most higher-frequency noise sources have amplitude distributions which are approximately Gaussian. Low-frequency noise with amplitude distributions other than Gaussian would, however, be very difficult to derive using these techniques.

The method of the present invention solves these problems of low-frequency noise generation existing in the prior art by utilizing a noise synthesizing technique which utilizes a digital-random variable. This technique solves the noise source problem by predicating performance on a digital-random variable. It solves the amplification problem by generating a high level signal that does not require further amplification. Lastly, it permits control of the statistical characteristics of resulting noise by making its amplitude distribution a function of a digital operation which is performed on the digital-random variable.

Furthermore, the synthesized noise developed by utilizing the present method, can be used in situations where ordinarily generated noise is inadequate. If the digital-random variable should be a suitable pseudo-random variable, the resulting noise function can be exactly reproducible. This feature enables noise experiments to be repeated and/or to be performed on linear systems having widely separated inputs and outputs. In this way, the feature of a reproducible noise can extend the utility of noise analysis on linear systems.

Prior art techniques utilizing a digital-random variable to generate low-frequency noise, such as the technique employed in the random signal generator disclosed in U.S. Pat. No. 3,366,779, issued to R. Catherall et al. on Jan. 30, 1968; or the technique employed in the Hewlett-Packard, Ltd. 3722A Noise Generator developed by Messrs. Anderson Finnie, and Roberts of Hewlett-Packard, Ltd., the H–P Subsidiary in Scotland, did not have the capability of synthesizing low-frequency noise having a variety of amplitude distributions, but rather could only provide low-frequency noise having a Gaussian distribution.

SUMMARY OF THE INVENTION

An object of the present invention is to provide a new and improved method of synthesizing low-frequency noise.

Another object of the present invention is to provide a new and improved method of synthesizing low-frequency noise which overcomes the disadvantages of the prior art.

Another object of the present invention is to provide a new and improved method of synthesizing low-frequency noise having a controllable amplitude distribution.

Another object of the present invention is to provide a new and improved method of synthesizing low-frequency noise having a controllable amplitude distribution by deriving the desired amplitude distribution from a digital-random-variable sequence.

Another object of the present invention is to provide a new and improved method of synthesizing low-frequency noise which is reproducible.

With these objects in view a method of synthesizing low-frequency noise may include the steps of generating a digital-random-variable sequence having a plurality of characteristics; selecting a desired digital-random-variable-sequence characteristic from the plurality of characteristics; deriving a desired amplitude-level distribution solely from the selected desired digital-random-variable-sequence characteristic, a different characteristic yielding a different desired amplitude-level distribution; and obtaining the desired low-frequency noise from the derived desired amplitude-level distribution.

Other objects and many of the intended advantages of this invention will be readily appreciated as the invention becomes better understood by reference to the following description when taken in conjunction with the following drawings wherein.

THEORY

Figure 1:
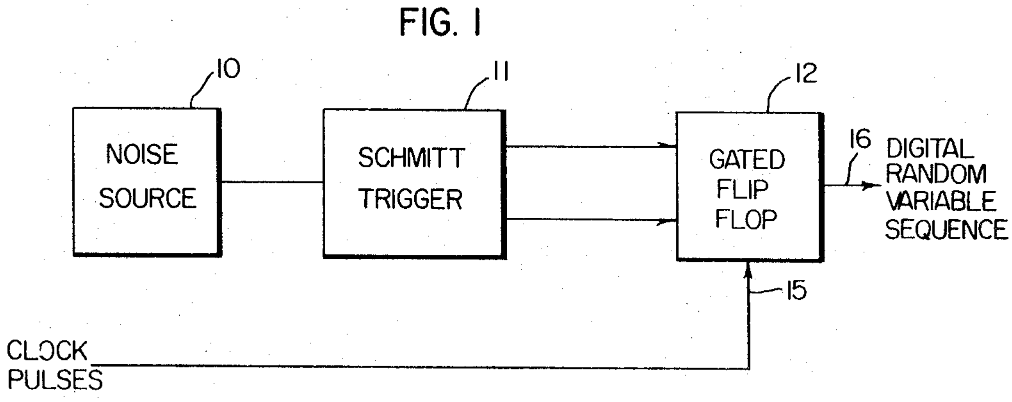
FIG. 1 is an embodiment illustrating a prior art method of generating a digital-random-variable sequence.

Low-frequency noise may be considered to be a band-limited noise signal which is defined from essentially DC to some cut off frequency. The noise is considered defined if it can be described by means of some characteristic such as its power spectrum, or its time-varying amplitude distribution. The high-frequency limit, merely states the limit to which the noise is defined; it does not preclude the existence of noise components above this high-frequency limit. Such components could exist, but their magnitudes would decrease with frequency. Such a characteristic would represent a filtered noise in which the bandwidth of the noise is wider than the bandwidth of the filter, and is very common in noise generation techniques.

The type of noise most often used as a signal, per se, is the so-called "white noise," defined as any random process whose spectral density is constant and thus independent of frequency. In actual practice this definition, which implies infinite power, is modified through the introduction of the concept of "band limited white noise." Such a noise is defined as one having a constant spectral density over a band of frequencies. The low-frequency noise defined above is consistent with such a definition of a band limited white noise.

The method of the present invention for the generation of low-frequency noise is dependent on the generation of randomly varying amplitude samples. The samples are constructed by means of digital operations on a two-state, digital-random-variable sequence. If the statistics of the digital-random-variable sequence are stationary, the amplitude distribution of the constructed samples is defined, and controlled, by the digital operation that is performed. The digital operation that is performed is dependent on the characteristic that is selected from a digital-random-variable sequence, such as the number of occurrences of one state of the two-state, digital-random variable in the digital-random-variable sequence during a selected interval. Thus, the synthesis technique of the present invention results in a noise function which is defined directly in terms of its amplitude distribution, and may be used to generate noise with any of a number of amplitude distributions.

In order to implement the synthesis technique of the present invention, it is necessary to first define a realizable digital-random variable and then to devise a digital logic which will extract from the random variable a characteristic which is convertible to the desired amplitude distribution. Although several amplitude distributions are possible using the method of the present invention, only three will be illustrated, the Gaussian, the Uniform, and the Poisson distributions.

The desired random variable is a stationary, two-state, clocked random variable in which the probabilities of each state are equal and in which the states are binomially distributed. A common example of such a random variable is an unbiased coin; the probability of a head equals the probability of a tail, and by tossing the coin several times a binomial distribution is generated.

Some methods of generating the required random variable are described by Granino Korn in a book entitled "Random Process Simulation and Measurements." One method, shown in FIG. 1, requires an analog random variable. The output of a noise source 10 is applied through a Schmitt trigger 11 to the set and to the reset gates on a flip flop 12. On each occurrence of the clock 15, the flip flop 12 will assume a "1" or a "0" state, depending on whether the set side of the flip flop 12 was higher or lower than the reset side when the clock 15 occurred. The output 16 of the flip flop 12 is the required binary random variable.

Figure 2:
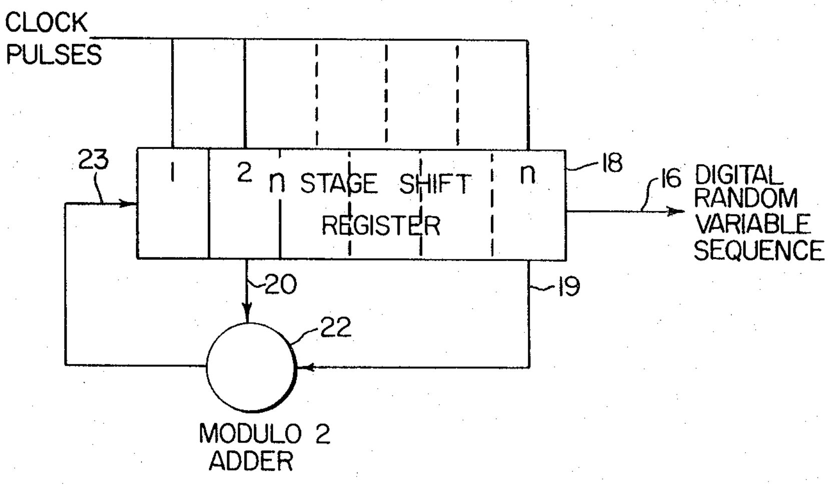
PRIOR ART FIG. 2
FIG. 2 is another embodiment illustrating another prior art method of generating a digital-random-variable sequence.

A second method, described by Korn, shown in FIG. 2, generates a pseudorandom binary sequence. This method employs a shift register 18, in which the output 19, 20 of two of the stages are added modulo 2 in a modulo 2 adder 22 to produce the register input 23, and thus generate a periodic sequence which has all the characteristics of the desired digital-random-variable sequence, but which has the limitation of periodicity. The effects of this periodicity may be minimized by lengthening the period of the sequence 16. The period of the digital-random-variable sequence 16 can be lengthened by increasing the number of shift register stages, and by proper choice of the stages which are to be added. The latter can result in a maximum length sequence having a length of $2^n-1$ bits, where $n$ is the number of stages in the shift register 18. Such a maximum length sequence would behave very similarly to sequences obtained by independent trials of two-state events in which the probabilities of a "1" and a "0" are equal. Except for the periodicity property, such a sequence has all the characteristics of the desired digital-random-variable sequence. As was previously mentioned, the effects of the periodicity can be minimized by increasing the length of the shift register 18. For example, Mr. Korn states, in the book just previously mentioned, that a maximum length 28-stage shift register will have a period of 268,435,455 bits. If such a shift register were clocked at a one megahertz rate, its period would be almost 4½ minutes. Such a period would be adequate for many experiments requiring a random variable, and if a longer period were desired, the number of stages would be increased. Furthermore, such experiments could be exactly reproducible, if the pseudorandom sequence were reproduced.

Such a sequence could be used to produce a Gaussian amplitude distribution. If counts were made of the number of "ones" in a sequence of $n$ independent two-state events, this occurrence being the selected characteristic for a Gaussian distribution, the count would be binomially distributed and centered about ½ $n$, as stated by Mr. Paul G. Hoel, in a book entitled "Introduction to Mathematical Statistics." If at the completion of the count the number was stored, the number would be available during the following counting period. A digital-to-analog converter connected to the storage devices would then produce a voltage level that is proportional to the count stored. Since the counts are themselves binomially distributed, the resulting levels would likewise be binomially distributed. Applying the standard statistical technique of deriving a Moment generating function, defined in terms of mathematical parameter "$\theta$," which is merely introduced to assist in determining the Moment, it can be shown, by applying the central limit theorem, that for large counts, the distribution will approach Gaussian.

The distribution function may be obtained from the Moment generating function. If $M_{x_1}(\theta)=M_{x_2}(\theta)$ then the distributions are equal.

$$M_x(\theta)\sum_{x}^{\infty}=e_o^{\theta x}f(x)$$

where $f(x)$ represents the distribution function, and $x$ is the random variable having the distribution represented by the function $f(x)$. The Moment generating function $M_x(\theta)$ converges for $f(x)$. If we let the variable $x$ represent the count, and $n$ represent the size of the sample, or the number of counts, the distribution of the counts approaches Gaussian as the size of the sample increases, the resultant Gaussian distribution being represented by the expression $$\lim_{n\to\infty} M_x(\theta)=e^{\theta^2}/2.$$

When $e^{\theta^2}/2$ is expanded in a power series, the distribution approaches a Gaussian distribution for a large number of terms.

The sequence could also be used to produce a uniform amplitude distribution. In this case, the probability of a particular arrangement of bits must be computed, the probability of a particular sequence being the selected characteristic for a uniform distribution. Because the binomial distribution is defined for independent events, the bits which make up a particular bit arrangement can be considered to be independent. The probability of a particular arrangement of the bits will be the product of the probabilities of the occurrence of each "1" and "0" in the particular sequence. This implies that the probability of a particular sequence of bits is a function only of the number of "ones" and "zeros" in that sequence, and not how the "ones" and "zeros" may be arranged to make up that sequence.

If a particular $m$ bit sequence contained $r$ ones, the probability of that sequence, $p(s)$, is given as, $p(s)=p(1)^r\,p(0)^{m1r}$. But the probability of a "1" is equal to the probability of a "0." Thus, $p(1)=p(0)=1-p(0)=½$. Substituting this result in the previous equation, the probability of the sequence becomes $p(s)=(½)^r(½)^{m1r}=(½)^m$. This equation shows that the probability of a particular sequence is a function only of the length $m$ of the sequence, implying that all sequences of the same length are equally probable.

If $m$ bit sequences were generated repeatedly, and each time the sequence was generated it was stored so as to be available while the next sequence was being generated, the contents of the storage device could be considered to be a binary number, all numbers between 0 and $2^m-1$ being equally probable. A digital-to-analog converter connected to the storage device would divide the available voltage source into $2^m$ equally probable discrete steps. As $m$ increases, the number of steps increases exponentially. Thus, the distribution of levels approaches a continuous uniform distribution between the two voltage limits 0 and $2^m-1$.

The sequence could also be used to produce a Poisson amplitude distribution. In this case, the phenomena that is exploited is that a binomial distribution is closely approximated by the Poisson distribution when the probability of one state is small and the number of trials is large. Many writers of statistics texts consider that a good approximation exists when the probability of one of the states is less than 10 percent. The necessary biasing of the digital-random-variable sequence is done by means of a digital logic which operates on the incoming digital random variable sequence to produce a second, highly biased, sequence which is a function of the original sequence and the logic. The exact logic used would be dependent on the degree of biasing which would be necessary for a particular application. An example of a type of logic which performs this function is one which senses for a particular pattern in the original sequence—yielding one state when the pattern is detected and the other state when it is not. The sequence detected is such that its probability of occurrence in the digital-random variable corresponds to the probability of one of the states of the Poisson distribution. The Poisson distribution is generated by counting the number of logic "ones" in a sequence of $n$ independent two-state events when the sequence of the two-state events form such a highly biased binomial distribution. The occurrence of these "ones" is the selected characteristic for the Poisson distribution. If at the completion of the count the number was stored, the number would be available during the following counting period. A digital-to-analog converter connected to the storage devices would then produce a voltage level that is proportional to the count stored. Since the counts have a Poisson distribution, the resulting levels would also have a Poisson distribution.

Once the levels are constructed, the low-frequency noise can be produced by low-pass filtering of the levels. This will result in a continuous band-limited noise function, as is shown by Woodward for the particular case of the Gaussian distribution in a book entitled "Probability and Information Theory, With Applications to Radar."

The sampling theorem indicates that a band-limited waveform may be recovered if it is sampled at a rate corresponding to at least twice its cut off frequency. When the sampling rate is less, the adjacent shifted spectra overlap and distortion results. When the sampling rate is exactly twice the cutoff frequency, the adjacent shifted spectra will not overlap; however, an ideal filter would be required to recover a desired spectrum. When the sampling rate is greater than twice the cutoff frequency, the adjacent spectra are further shifted and gaps, sometimes called "guard bands," begin to appear between adjacent spectra. Where such guard bands are used, the desired spectrum can be recovered with realizable filters having finite skirts. It can be shown that similar conditions apply to the construction of samples when synthesizing a band-limited noise. Should the samples be constructed at a rate corresponding to greater than twice the desired cutoff frequency, a phenomena analogous to the guard bands exist which enable the desired synthesized noise to be recovered by means of a realizable filter.

As ordinarily used, the term "guard bands" applies to the separation of the spectra of a sampled band-limited waveform. In the present method of synthesis, there is no original band-limited waveform from which to define the cutoff frequency. In the present method, the cutoff frequency is determined by means of the filter. If noise samples are constructed at a rate greater than twice the cutoff frequency of the filter, noise components above this frequency will be generated but will be attenuated by the filter. This will result in a noise function which is defined from DC to the cutoff frequency, but with components above the cutoff frequency whose magnitudes decrease with frequency. Thus, the guard bands as applied to the present method of noise synthesis, merely increase the bandwidth of the synthesized noise so that the noise bandwidth is greater than the filter bandwidth. This permits the use of filters with finite skirts to be used to recover the noise function, provided that the bandwidth of the noise is greater than the bandwidth of the filter and its skirts.

The sampling theorem specifies the minimum rate at which samples must be taken in order to recover a signal. Consider a particular case where samples are taken at so high a rate that the samples can be considered to be tracking the original signal directly. In this hypothetical situation, with the samples and the original function being almost identical, it is apparent that the two would have identical amplitude distributions. Since samples taken at the minimum rate specified by the sampling theorem would reproduce the same function, it must generally be true that the amplitude distribution of the samples is the same as that of the original function. Since the recovered signal of a properly sampled waveform is the same as the original waveform, it is apparent that their amplitude distributions are identical.

Since the amplitude distribution of the samples and the original function are identical, and since the amplitude distribution of the original and the recovered signals are identical, it must be true that the amplitude distribution of the filtered waveform is the same as that of the samples.

Thus, noise with any amplitude distribution may be synthesized so long as samples can be constructed having the form of a properly sampled function and having the desired amplitude distribution.

The power density spectrum of such a set of samples can be determined. For the case of independent successive, wide (100 percent duty cycle) samples, the autocorrelation $\psi_{11}(\tau)$, is $$\psi_{11}(\tau)=P_0(T-|\tau|) \text{ for } o<|\tau|<T, \text{ and}$$
$$\psi_{11}(\tau)=0 \text{ for } |\tau|>T$$

where $T$ is the sampling rate, and where the total power, $P_o$, is, $$P_0=\lim_{n\to\infty} 1/nT\left[\sum_{k=1}^{n}(E_k)^2\right]$$

where $E_k$ is the magnitude of the $k$'th sample. By examining the previous equation, it can be seen that various amplitude distributions can cause the value of $P_o$ to take on various values. Such variations, however, will merely vary the magnitude of the autocorrelation function, they will not alter its form. The power density spectrum resulting from the autocorrelation function defined previously is $$\Phi(f)=P_0T\left(\frac{\sin \pi ft}{\pi ft}\right)^2$$

By examining this equation it can be seen that the only term which will vary with various amplitude distributions is $P_o$, the magnitude of the power spectrum.

Since variations of the amplitude distribution affect only the magnitude of the power spectrum and not its shape, the resultant power spectrum of all synthesized noise functions resulting from this method will be of the same form. That the power density spectrum is essentially flat can be shown as follows. The expression for the power density spectrum has been given as $$\Phi(f)=P_0T\left(\frac{\sin \pi ft}{\pi ft}\right)^2$$

The zero crossings of this expression will occur when $\pi ft=n\pi$ or when $ft$ equals an integer, and these points will correspond to reciprocals of the sampling rate. The value of the $(\sin x/x)^2$ term at half the sampling rate can be computed as follows $$\left(\frac{\sin \pi/2}{\pi/2}\right)^2=4/\pi^2$$

This corresponds to a variation of little more than 3 db. in the power level from DC to the noise cutoff frequency when this frequency corresponds to half the sampling rate. As the sampling rate increases relative to this cutoff frequency, the flatness of the power spectrum improves. It can, therefore, be concluded that the synthesis technique of the present invention will result in band-limited noise with a relatively flat power density spectrum.

The synthesis process of the present invention consists basically of constructing randomly varying amplitude levels at a uniform rate in time, and then low-pass filtering these levels to yield the low-frequency noise, the resultant low-frequency noise having a relatively flat power density spectrum within the frequency range for which it is defined.

Operation

The previous discussion has shown that noise with particular properties can be synthesized if the samples are constructed to be of a particular form, and if the amplitude distribution of the samples is the same as the amplitude distribution of the desired noise. The three types of noise which are to be synthesized utilizing the method of the present invention, for purposes of illustration, differ only in their amplitude distribution.

Noise with controllable properties could be synthesized with wide or with narrow pulses. In the three synthesizers to be described for purposes of illustration, the wide (100 percent duty cycle) is utilized exclusively. This choice offers two distinct advantages over the narrow sample choice; it results in a higher level noise output, since the magnitude of the baseband spectrum is proportional to the duty cycle; and it is easier to implement.

The construction of samples by means of a digital-random variable results in a discrete amplitude distribution which will approach a continuous distribution as the number of levels increases. The number of levels necessary to consider the approximation valid depends on the acceptability criteria of the synthesized noise. In the distributions selected for purposes of illustration, a set of 64 levels will be utilized. This decision, though arbitrary, is not an unrealistic choice when compared with the number of levels in existing pulse code modulation systems. For example, speech has been adequately encoded in 32 levels, and television has been adequately encoded in 64 levels.

Figures 5, 6:
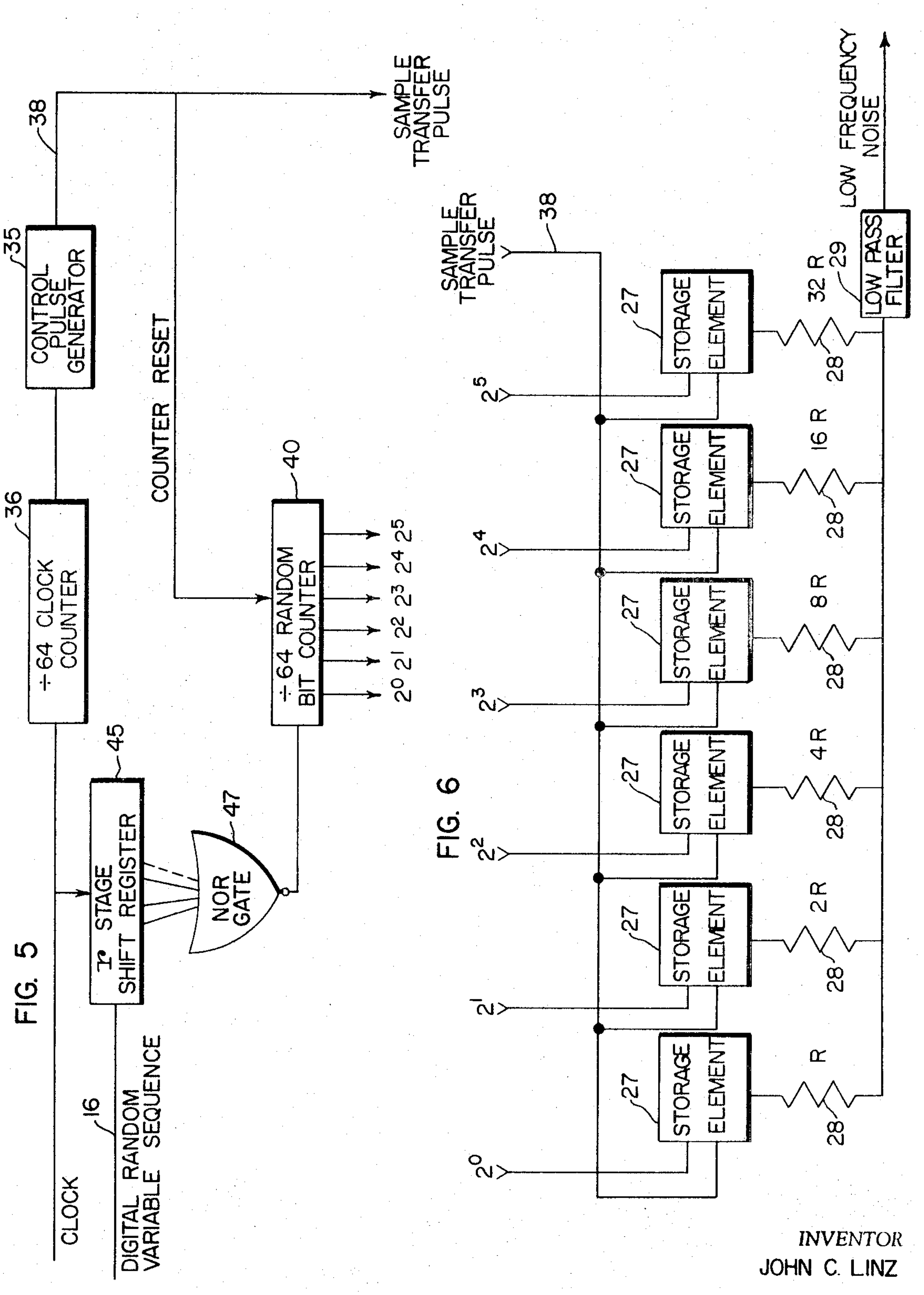
FIG. 5 is an embodiment employing the method of the present invention for generating a Poisson amplitude-level distribution.
FIG. 6 is an embodiment employing the method of the present invention for obtaining low-frequency noise from the desired amplitude-level distribution.

The requirement for a 100 percent duty cycle can be achieved by using some device to store the level while the following level is being generated. Since the 64 levels are distinguishable by six binary bits, it would be possible to implement this storage function with six bits of binary storage. Conversion of the stored digital information to amplitude levels is done by means of a digital-to-analog converter, which for purposes of illustration is simply a set of weighted resistors connected to the storage elements. FIG. 6 shows a block diagram of the sample structure determining portion of the synthesizers.

It is noted that the power level and/or the voltage level requirements of the noise can be met by proper design of the D-to-A converter. For example, if a higher voltage noise was required, the storage elements 27—27 in FIG. 6 could be used to digitally gate a higher voltage source on, or off, at the weighted resistors 28—28. This obviates the need for amplifiers, with their usual low-frequency limitations, in raising the noise to useable levels.

Although the filter 29 does not directly relate to the sample structure, it is mentioned here because it is common to all three synthesizers being described. If for purposes of illustration we choose a noise cutoff frequency of 5,000 hertz, the requirements on the filter 29 are that it must pass all components below 5,000 hertz, and attenuate all components above that frequency. If we incorporate guard bands into the spectrum, the filter 29 can have realizable rolloff characteristics above the 5,000 hertz limit.

As was previously mentioned the samples must be constructed at a rate corresponding to at least twice the desired cutoff frequency. In order to ease the filter requirements, it is desireable to construct samples at a higher rate, and thus introduce guard bands in the frequency spectrum of the samples. In the synthesizers being illustrated, the samples will be constructed at a rate of 20,000 samples per second, a rate corresponding to four times the synthesized noise cutoff frequency. This sampling rate will generate a power spectrum that is flat within 1 db.

GAUSSIAN DISTRIBUTION SYNTHESIZER

As was stated previously, the number of ones in a random binary sequence will be binomially distributed about $n/2$, where $n$ is the number of bits in the sequence. The counts can be produced by means of two binary counters, one to determine the length of the sequence, and one to count the number of "ones" in the sequence. Where 64 levels are desired, two six-stage ripple counters could be utilized.

Figures 3, 4:
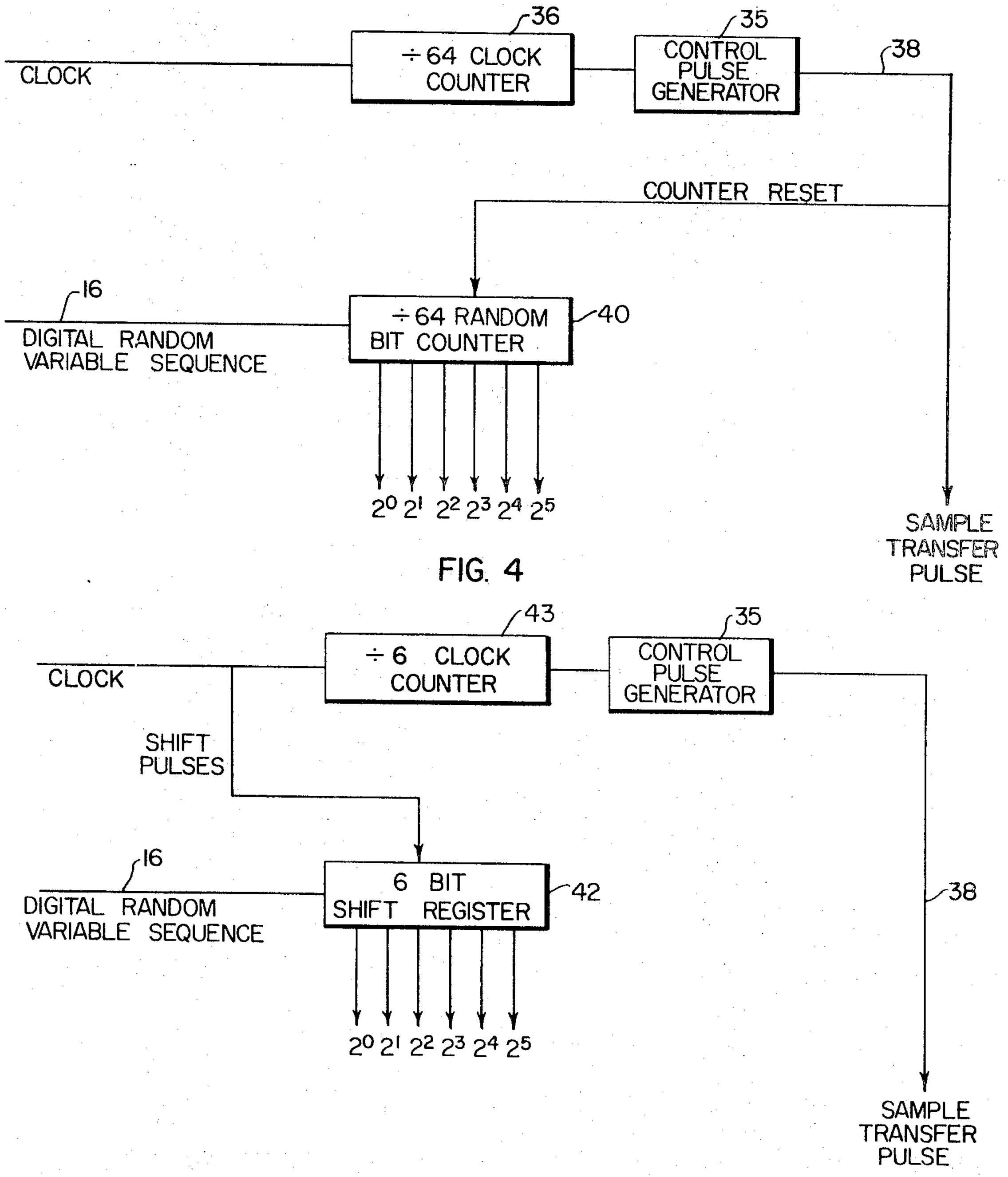
FIG. 3 is an embodiment employing the method of the present invention for generating a Gaussian amplitude-level distribution.
FIG. 4 is an embodiment employing the method of the present invention for generating a uniform amplitude-level distribution.

Referring now to FIG. 3, which is a Gaussian distribution synthesizer utilizing the method of the present invention, a buffer, or control pulse generator 35, connected to the last stage of the clock counter 36, produces a pulse 38 on one of the transitions of the last stage. This pulse 38, which must occur at the rate at which the samples are to be generated, transfers the count on the second counter 40 into the storage registers 27—27 of the D-to-A converter, and resets the second counter 40, thus enabling the second counter 40 to count the "ones" in the following sequence. These sequences must be generated at a rate of 20,000 per second. Since it takes 64 random bits to construct each sample, the random bits must be available at a 1,280,000 bits per second rate.

The clock counter 36, and the random bit counter 40 which were utilized in the Gaussian distribution synthesizer shown in FIG. 3, were both divided by 64 counters. The digital-random-variable-sequence 16 was input to the random bit counter 40, and the clock was input to the clock counter 36. The clock counter 36 output was buffered with the control pulse generator 35, then fed to the D-to-A converter, providing the transfer transitions at a 20,000 hertz rate by means of sample transfer pulse 38. This control pulse 38 also goes to the reset lines on each of the register elements in the random bit counter 40.

UNIFORM DISTRIBUTION SYNTHESIZER

As was previously mentioned, for a uniform distribution, of $2^m$ levels, it is only necessary to record sets of $m$ independent bits. For 64 levels, six independent bits are required. These can be obtained simply by shifting random bits into a shift register 42. Independent sets are assured if the contents of the shift register 42 are transferred into the storage register once every six (or more) clock times; this is to insure that at least six new random bits are entered into the shift register 42 between transfer pulses 38. A divide by six clock counter 43 counts clock pulses to ensure that a transfer pulse 38 is generated every sixth clock time.

The six-bit numbers must be produced at a 20,000 hertz rate. Since this technique requires six random bits between transfers, the random bits must be available at a 120,000 bits per second rate. The digital-random-variable sequence 16 is input to the six-bit shift register 42. The clock shift pulses are also input to the six-bit shift register 42. The clock is also input to the divide by six clock counter 43, whose output is fed to a control pulse generator 35 which generates the sample transfer pulse 38. The output of the six-bit shift register 42, and the sample transfer pulse 38 are input to the D-to-A converter storage elements 27—27, and are, ultimately, filtered through the low pass filter 29 to yield the desired low-frequency noise distribution.

POISSON DISTRIBUTION SYNTHESIZER

As was previously discussed, for a Poisson distribution it is necessary to modify the digital-random-variable sequence in a way such that a new sequence is produced having a highly biased binomial distribution, and that the probability of one of the states of this distribution should be less than 10 percent. It has previously been stated that a way of accomplishing this is to sense for a pattern in the digital-random-variable sequence.

As can be seen in FIG. 5, the digital-random-variable sequence 16 is shifted directly into an $r$ stage shift register 45. Thus, during operation, $r$ consecutive bits of the digital-random-variable sequence are located in the shift register 45. An $r$ input Nor gate 47 is connected to the shifted register 45, each input being connected to one of the stages of the shift register 45. The output of the NOR-gate 47 will be "zero" at all times except when all $r$ inputs are "zero." Thus, the pattern which is detected is $r$ consecutive "zeros." It is noted that the resulting statistic is independent of the particular pattern which is sensed; thus, any $r$ input gate will perform the same function as the NOR-gate 47. The probability, $p$, of a "one" in the resultant sequence, with this particular technique, is $2^{1r}$. For example, choosing $r$=4, the probability of a "one" in the resultant (biased) sequence is $2^{14}$=6.25 percent which is less than 10 percent.

The output of the nor gate 47 is input to a divide by 64 random bit counter 40, this input being a Poisson distribution. A clock is input to a divide by 64 clock counter 36, whose output is fed to a control pulse generator 35 which provides the sample transfer pulse 38, and counter reset pulse 38. The clock is also input to the $r$ stage shift register 45. The output of the divide by 64 random bit counter 40, and the sample transfer pulse 38 are fed to the storage elements 27—27, whose outputs are passed through weighted resistors 28—28, and low-pass filter 29 to obtain low-frequency noise having a Poisson distribution.

SAMPLE STRUCTURE DETERMINING SECTION

The sample structure determining section, which for the illustrations enumerated is a D-to-A converter, as was previously discussed, consists of six storage elements 27—27, and six weighted resistors 28—28. The values of the weighted resistors are R, 2R, 4R, 8R, 16R, and 32R, respectively. It is the outputs of these weighted resistors 28—28 that are fed to the low-pass filter 29. The gate input to the storage elements 27—27 is the output of the stages of the shift register 42 or of the random bit counter 40, which for purposes of the described examples is a six-bit random counter. These gate inputs are the level to be stored. The clock input to the storage elements 27—27, which is the sample transfer pulse 38, reads the level on the gates when they are pulsed on by the sample transfer pulse 38, passing the outputs of the storage elements 27—27 through the appropriate weighted resistors 28—28 to the low-pass filter 29 to provide the analog, amplitude-distribution level of the desired low-frequency noise.

The method of the present invention may be used to synthesize noise by transforming a digital-random-variable into a low-frequency noise with a controllable amplitude distribution in the time domain. This method is independent of the source of the digital-random variable, as was previously described; that is, it is compatible with an actual digital-random variable or with a pseudo-random-digital variable. Pseudo-random sequences can be generated with periods of several minutes, and which possess all the characteristics of a true random sequence within that period. The use of such a psuedorandom sequence, with a sufficiently long period, as a random variable in the noise synthesizer, will add new dimensions in the use of noise as an analytical tool. Such a combination makes possible the generation of an analog noise that has controllable statistics, and can be exactly reproduced. With the synthesized noise produced by utilizing the method of the present invention, one is able to correlate the system output of a linear system with the system input, even when the output and input are physically separated, in order to measure the impulse response of the linear system; and is applicable to measuring the impulse response of transmission lines or of any other linear communications media. Furthermore, such measurements are repeatable, again, by regenerating the original noise function. Such a synthesized noise might also have value in developing a technique for measuring a loss of entropy in a linear system.

Another area in which such a synthesized noise might also have value is the area of analog computer applications. The analog computer is used for various statistical studies and for simulations which include the effects of random phenomena. For such use a suitable random variable must be available. This would generally be a low-frequency noise with well defined and controlled statistics. The noise synthesis method of the present invention extends the power of these analog computer applications by making various well defined and controlled statistical distributions available, and enabling the exact duplication of the statistical experiment or the simulation whenever a reproducible noise is generated.

It is to be understood that the above described embodiments of the invention are merely illustrative of the principles thereof and that numerous modifications and embodiments of the invention may be derived within the spirit and scope thereof, such as selecting a different characteristic which would yield a different amplitude level distribution than those enumerated, or varying the number of amplitude levels to alter the noise quality.

What is claimed is:

1. A method of synthesizing low-frequency noise, having a controllable amplitude distribution, comprising the steps of:
   generating a digital-random-variable sequence having a plurality of characteristics;
   selecting a desired digital-random-variable-sequence characteristic from the plurality of characteristics;
   deriving a desired amplitude-level distribution solely from the selected desired digital-random-variable sequence characteristic, a different characteristic yielding a different desired amplitude-level distribution; and
   obtaining the desired low-frequency noise from the derived amplitude-level distribution.

2. A method in accordance with claim 1, wherein the step of generating a digital-random-variable sequence includes the step of:
   generating a plurality of two-state, clocked, digital-random variables in which each of the two states has an equal probability of occurrence, the states being binomially distributed.

3. A method in accordance with claim 2, wherein the step of generating a plurality of two-state, clocked, digital-random variables further includes the steps of:
   generating a plurality of analog-random variables; and
   deriving the plurality of two-state, clocked, digital-random variables from the generated plurality of analog-random variables.

4. A method in accordance with claim 2, wherein the step of generating a plurality of two-state, clocked, digital-random variables includes the step of:
   generating a pseudo-random-binary sequence.

5. A method in accordance with claim 2, wherein the step of selecting a desired digital-random-variable characteristic includes the stops of:
   determining a sampling interval and
   obtaining digital information, from the selected characteristic during the determined sampling interval, equivalent to an amplitude level of the desired amplitude-level distribution.

6. A method in accordance with claim 5, wherein the step of deriving a desired amplitude-level distribution includes the steps of:
   storing the obtained digital information during the determined sampling interval while the next successive digital-information equivalent is obtained during the next determined sampling interval.

7. A method in accordance with claim 6, wherein the steps of deriving a desired amplitude-level distribution further includes the step of:
converting the stored, obtained, digital information into an equivalent, analog-amplitude level of the desired amplitude-level distribution.

8. A method in accordance with claim 7, wherein the step of determining a sampling interval includes the further steps of:
deriving a transfer pulse; and
transmitting the derived transfer pulse at the completion of the sampling interval.

9. A method in accordance with claim 8, wherein the step of storing the obtained information includes the further steps of:
receiving the transmitted derived transfer pulse; and
storing the obtained, digital information when the transmitted transfer pulse is received.

10. A method in accordance with claim 9, wherein the further step of converting the stored digital information includes the still further step of:
converting the stored digital information into the equivalent, analog-amplitude level of the desired amplitude-level distribution, when the transfer pulse is received.

11. A method in accordance with claim 10, wherein the step of obtaining the desired low-frequency reproducible noise includes the step of:
filtering the converted equivalent, analog-amplitude level by passing the converted level through a low-pass filtering means.

12. A method in accordance with claim 11, wherein the further step of transmitting the derived transfer pulse at the completion of the sampling interval includes the still further step of:
transmitting the derived transfer pulse at a rate equivalent to at least twice the cutoff frequency of the low-pass filtering means.

13. A method in accordance with claim 12, wherein the still further step of transmitting the derived transfer pulse at a rate equivalent to at least twice the cutoff frequency of the low-pass filtering means includes the still further step of:
transmitting at a rate greater than twice the cutoff frequency so as to provide guard bands.

14. A method in accordance with claim 13, wherein the step of obtaining digital information during the sampling interval includes the further step of:
obtaining the digital information within the entire sampling interval.

15. A method in accordance with claim 14, wherein the step of storing the obtained, digital information during the determined sampling interval includes the further step of:
storing the obtained, digital information during the entire determined sampling interval.

16. A method in accordance with claim 15, wherein the step of obtaining the desired low-frequency, reproducible noise includes the step of:
controlling the magnitude of the power spectrum of the low-frequency, reproducible noise.

17. A method in accordance with claim 16, wherein the step of obtaining the desired low-frequency, reproducible noise includes the further step of:
controlling the voltage level of the low-frequency reproducible noise obtained.

18. A method in accordance with claim 17, wherein the step of deriving a desired amplitude-level distribution includes the further step of:
driving a 64 level desired amplitude-level distribution.

19. A method in accordance with claim 2, wherein the step of deriving a desired amplitude-level distribution includes the step of:
deriving a Gaussian-amplitude-level distribution.

20. A method in accordance with claim 19, wherein the step of selecting a desired digital-random-variable-sequence characteristic includes the steps of:
determining a sampling interval; and
counting the number of occurrences of one state in the desired sequence during the determined sampling interval, the number of occurrences being the selected sequence characteristic.

21. A method in accordance with claim 20, wherein the step of deriving a Gaussian-amplitude-level distribution includes the further step of:
storing the count during the determined sampling interval at the completion of the count, while the next-successive count is obtained during the next-determined sampling interval.

22. A method in accordance with claim 21, wherein the step of deriving a Gaussian-amplitude-level distribution includes the still further step of:
converting the stored count into an equivalent, analog-amplitude level of the Gaussian-amplitude-level distribution, the counts being binominally distributed.

23. A method in accordance with claim 22, wherein the step of determining a sampling interval includes the further steps of:
deriving a transfer pulse; and
transmitting the derived transfer pulse at the completion of the sampling interval, the completion of the count being at the completion of the sampling interval.

24. A method in accordance with claim 23, wherein the further step of storing the count includes the still further steps of:
receiving the transmitted transfer pulse; and
storing the count when the transfer pulse is received.

25. A method in accordance with claim 24, wherein the further step of converting the stored count includes the still further step of:
converting the stored count into the equivalent, analog-amplitude level of the Guassian-amplitude-level distribution, when the transfer pulse is received.

26. A method in accordance with claim 25, wherein the step of counting the number of occurrences includes the further step of:
counting the number of occurrences for a plurality of $n$ counting intervals, the number of $n$ counting intervals conforming to the mathematical expression $$\lim_{n\to\infty} M_x(\theta)=e^{\theta^2}/2$$

which is a moment-generating function for the Gaussian-amplitude-level distribution.

27. A method in accordance with claim 26, wherein the further step of counting for a plurality of $n$ counting intervals includes the still further step of:
counting for at least 64 counting intervals.

28. A method in accordance with claim 2, wherein the step of deriving a desired amplitude-level distribution includes the step of:
deriving a uniform-amplitude-level distribution.

29. A method in accordance with claim 28, wherein the step of selecting a desired digital-random-variable-sequence characteristic includes the step of:
determining a sampling interval; and
selecting a sequence characteristic which is the probability of particular sequences, a sequence probability satisfying the expression $p(s)=(\frac{1}{2})^m$, where $m$ is the number of bits in the generated-digital-random-variable sequence, the number of bits in the sequence being the sequence length.

30. A method in accordance with claim 29, wherein the step of deriving a uniform-amplitude-level distribution includes the further step of:
storing the particular, generated sequence of $m$ bits during the determined sampling interval at the completion of the generation of the sequence, while the next-successive-particular sequence is being generated, the stored sequence being a binary number, all numbers between limits 0 and $2^m-1$ having an equal probability of occurrence.

31. A method in accordance with claim 30, wherein the step of deriving a uniform-amplitude-level distribution includes the still further step of:

converting the stored-particular sequence into an equivalent, analog-amplitude level of the uniform-amplitude-level distribution, the distribution of the amplitude levels approaching a continuous uniform distribution between the limits 0 and $2^m-1$.

32. A method in accordance with claim 31, wherein the step of determining a sampling interval includes the further steps of:

deriving a transfer pulse; and transmitting the derived transfer pulse at the completion of the sampling interval, the completion of the sequence being at the completion of the sampling interval.

33. A method in accordance with claim 32, wherein the further step of storing the particular sequence includes the still further steps of:

receiving the transmitted transfer pulse; and storing the sequence when the transfer pulse is received.

34. A method in accordance with claim 33, wherein the step of converting the stored, particular sequence includes the still further step of:

converting the transferred, stored sequence into the equivalent, analog-amplitude level of the uniform-amplitude-level distribution, when the transfer pulse is received.

35. A method in accordance with claim 34, wherein the still further step of converting the transferred, stored sequence includes the still further step of:

dividing an available voltage source into $2^m$ equally probable discrete steps, each discrete step being a possible amplitude level.

36. A method in accordance with claim 35, wherein the further step of storing a sequence of *m* bits includes the still further step of:

storing a sequence of six bits in length, *m* being equal to six.

37. A method in accordance with claim 2, wherein the step of deriving a desired amplitude-level distribution includes the step of:

deriving a Poisson-amplitude-level distribution.

38. A method in accordance with claim 37, wherein the step of deriving a desired amplitude-level distribution further includes the step of:

producing a highly biased binomial distribution which is a function of the original digital-random-variable sequence from the selected characteristic.

39. A method in accordance with claim 38, wherein the step of selecting a desired digital-random-variable-sequence characteristic includes the steps of:

selecting the condition when a desired number *r* of adjacent bits of the generated sequence is the same, the number *r* being dependent solely on the desired fidelity of the Poisson-amplitude-level distribution; and transmitting one desired state of a two-state, digital-random variable when the selected condition occurs, the probability of occurrence ($p$) of the desired state satisfying the expression $p=2^{1r}$.

40. A method in accordance with claim 39, wherein the step of selecting a desired digital-random-variable-sequence characteristic includes the further steps of:

determining a sampling interval;

receiving the desired state being transmitted; and counting the number of occurrences of the one-desired state in the desired sequence during the determined sampling interval, the number of occurrences being the selected characteristic.

41. A method in accordance with claim 40, wherein the step of deriving a Poisson-amplitude-level distribution includes the further step of:

storing the count during the determined sampling interval at the completion of the count, while the next-successive count is obtained during the next-determined, sampling interval.

42. A method in accordance with claim 41, wherein the step of deriving a Poisson-amplitude-level distribution includes the still further step of:

converting the stored count into an equivalent, analog-amplitude level of the Poisson-amplitude-level distribution, the counts yielding a highly biased binomial distribution.

43. A method in accordance with claim 42, wherein the step of determining a sampling interval includes the further steps of:

deriving a transfer pulse; and transmitting the derived transfer pulse at the completion of the sampling interval, the completion of the count being at the completion of the sampling interval.

44. A method in accordance with claim 43, wherein the further step of storing the count includes the still further steps of:

receiving the transmitted transfer pulse; and storing the count when the transfer pulse is received.

45. A method in accordance with claim 44, wherein the further step of converting the stored count includes the still further step of:

converting the transferred, stored count into the equivalent, analog-amplitude level of the Poisson-amplitude-level distribution, when the transfer pulse is received.

46. A method in accordance with claim 45, wherein the step of selecting the desired digital-random-variable-sequence characteristic includes the further step of selecting the condition having a probability of occurrence of less than one-tenth, the desired number *r* being equal to at least four.

UNITED STATES PATENT OFFICE
CERTIFICATE OF CORRECTION

Patent No. 3,614,399 Dated October 19, 1971

Inventor(s) John C. Linz

It is certified that error appears in the above-identified patent and that said Letters Patent are hereby corrected as shown below:

Column 4, line 30, that portion of the formula reading "$M_{x_2} 11(\theta)$" should read --$M_{x_2}(\theta)$;

Column 4, line 33, the formula "$M_x(\theta)\sum_x^{\infty}=e_o^{\theta x}f(x)$" should read --

$$M_x(\theta)=\sum_{x=o}^{\infty}e^{\theta x}f(x)$$ --;

Column 4, line 65, that portion of the formula reading "$p(0)^{m1r}$" should read --$p(0)^{m-r}$--;

Column 4, line 69, that portion of the formula reading "$(1/2)^{m1r}$" should read --$(1/2)^{m-r}$--;

Column 9, line 22, the term "$2^{1r}$" should read --$2^{-r}$--;

Column 9, line 24, the term "$2^{14}$" should read --$2^{-4}$--;

Column 12, line 44, that portion of the formula reading "$e^{\theta^2}|2$" should read --$e^{\theta^2/2}$--.

Signed and sealed this 2nd day of May 1972.

(SEAL)
Attest:

~~EDWARD M.FLETCHER,JR.~~
Attesting Officer

~~ROBERT GOTTSCHALK~~
Commissioner of Patents